United States Patent Office 3,726,898
Patented Apr. 10, 1973

3,726,898
INDOL-2-YLPHENYLACETIC ACIDS AND ESTERS
Robert L. Duncan, Jr., and Robert F. Boswell, Jr., Richmond, Va., assignors to A. H. Robins Company, Incorporated, Richmond, Va.
No Drawing. Filed Aug. 23, 1971, Ser. No. 174,144
Int. Cl. C07d 27/56
U.S. Cl. 260—326.13 R                     5 Claims

ABSTRACT OF THE DISCLOSURE

The present invention discloses indol-2-ylphenylacetic acids and esters wherein the indol-2-yl radical is attached to the phenyl radical of the phenylacetic acid moiety at the meta and para positions. The indol-2-ylphenylacetic acids are useful in ameliorating distress in animals caused by inflamed tissue. The esters of the indol-2-ylphenylacetic acids are useful precursors. The novel compounds are prepared by reacting phenylhydrazine and monosubstituted phenylhydrazines with lower alkyl m- and p-acetylphenylacetates to give the corresponding hydrazones. The latter are cyclized in polyphosphoric acid or in an acidic alcoholic medium to the indol-2-ylphenylacetates which are hydrolyzed to the acids. The precursor hydrazones having the free carboxylic acid moiety are also useful in ameliorating inflamed tissue.

---

The present invention is concerned with heterocyclic compounds useful in ameliorating distress caused by inflammation and is more particularly concerned with indol-2-ylphenylacetic acids and esters, the intermediate hydrazones therefor, and to methods for making and using the same.

The novel compounds of the present invention can be represented by the following formula:

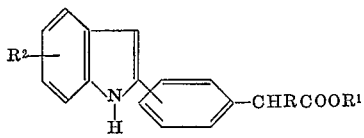

Formula I wherein R is hydrogen and lower alkyl, $R^1$ is hydrogen and lower alkyl and $R^2$ is hydrogen, halogen, trifluoromethyl, lower-alkyl and lower-alkoxy.

The present invention is also concerned with the precursor hydrazones which can be represented by the following Formula II wherein R, $R^1$ and $R^2$ are as defined hereinabove. The compounds of Formula II wherein $R^1$ is hydrogen also possess anti-inflammatory properties.

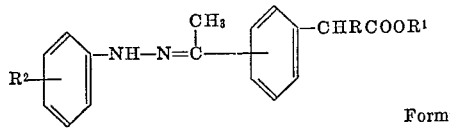

Formula II

The esters of the hydrazones of Formula II do not possess anti-inflammatory properties. They are especially useful as intermediate precursors of the indole compounds. The compounds of Formula I in their ester form are useful for purification procedures and as intermediates of the physiologically active acids.

The novel compounds described hereinafter and represented by Formulae I and II above have been tested in vivo according to the method of Sancilio, L. F., J. Pharm. and Exptl. Therap. 168, 199–204 (1969). The compounds of Formulae I and II wherein $R^1$ is hydrogen have been found useful in ameliorating distress caused by inflamed tissue.

In a preferred embodiment of the present invention the indolyl radical is attached to the phenyl radical of the phenylacetic acid moiety at the para position. Another embodiment includes the m-(indol - 2 - yl)phenylacetic acids.

It is, therefore, an object of the present invention to provide novel indol-2-ylphenylacetic acids. Another object is to provide novel indol-2-ylphenylacetic acids useful for their anti-inflammatory properties. A still further object is to provide novel hydrazones useful for their anti-inflammatory properties. Additional objects will become apparent hereinafter to one skilled in the art by the following description, examples and the appended claims.

The term "lower-alkyl" when used in the specification and claims includes straight and branched chain radicals of 1 to 8 carbons inclusive and is exemplified by such groups as methyl, ethyl, n-propyl, isopropyl, n-butyl, sec. butyl, amyl, isoamyl, hexyl, heptyl, octyl and the like.

The term "lower-alkoxy" has the formula —O-lower-alkyl.

When halogen is referred to herein, preferably but not necessarily a halogen of atomic weight not greater than eighty is employed. Of the halogens, fluorine and chlorine are preferred.

METHOD OF PREPARATION

The compounds of the present invention are prepared by the following sequence of reactions:

A phenylhydrazine of the formula

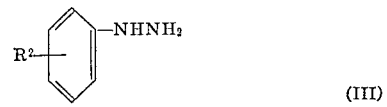

(III)

wherein $R^2$ is as defined above, is reacted with an equimolar quantity of a para-(or meta)acetylphenylacetate of the formula

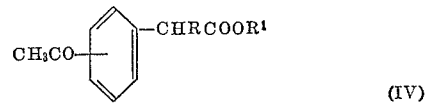

(IV)

wherein R and $R^1$ are as represented above, in an alcoholic medium containing a catalytic amount of glacial acetic acid to give a hydrazone of the formula

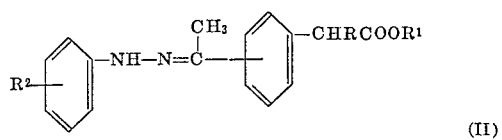

(II)

which is cyclized in polyphosphoric acid or in an acidic alcoholic medium to the indol-2-ylphenylacetates of the formula

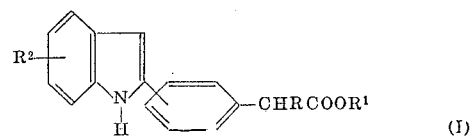

(I)

In the foregoing reaction sequence, $R^1$ can be hydrogen as well as lower alkyl. The ester form is preferred for the cyclization of the hydrazone II to the indole I as the ester form permits a more facile separation of isomers.

In the preferred method of preparing the novel compounds, the reaction materials and conditions for the above-identified reactions are generally as follows.

A stirred solution of a lower alkyl m- or p-acetylphenylacetate IV in a suitable organic solvent such as ethanol containing a catalytic amount of glacial acetic acid is treated with phenylhydrazine or an appropriately substituted phenylhydrzine III. The mixture is refluxed for a period of from about a few minutes to about one hour. The phenylhydrazone II generally separates from the cooled solution as a crystalline solid and requires no further purification.

The cyclization of the phenylhydrazones II to the indol-2-ylphenylacetate I is generally accomplished by mixing one part of the phenylhydrazone with six to ten parts of polyphosphoric acid and heating the mixture to a temperature of from about 75° C. to about 120° C. depending on the particular phenylhydrazone. The cyclization is accompanied by an exothermic reaction which raises the pot temperature approximately 15 to 40° C. After the exothermic reaction is over the mixture is treated with ice and water and the product which generally separates as a solid is collected by filtration. It has also been observed that cyclization can be effected by saturating an ethanolic solution of the phenylhydrazone with dry hydrogen chloride and allowing the solution to stand for a period of time at ambient temperature.

When the phenylhydrazone II has no substituent in the phenyl ring of the phenylhydrazine moiety or when the substituent is in the ortho or para position only one indole is formed which is purified by crystallization from a suitable solvent. An ortho substituent furnishes a 7-substituted indole and a para substituent give a 5-substituted indole. When the substituent is in the meta position of the phenylhydrazine moiety, the product is a mixture of 4- and 6-substituted indoles which are separated by column chromatography or by fractional crystallization.

The indol-2-ylphenylacetic acids are obtained from the ester precursors by acidic or basic hydrolysis as is more fully demonstrated in the examples which follow.

The following examples illustrate the methods whereby the novel compounds of Formulae I and II are prepared.

EXAMPLE 1

Ethyl (p-acetylphenyl)acetate o-trifluoromethylphenylhydrazone

A mixture of 8.8 g. (0.05 mole) of o-trifluoromethylphenylhydrazine, 10.3 g. (0.05 mole) of ethyl p-acetylphenylacetate and 1 ml. of glacial acetic acid in about 75 ml. of absolute ethanol was refluxed for about one hour. The reaction mixture was allowed to cool to room temperature and the product crystallized upon seeding. The solid product was collected by filtration and air-dried to give 13.4 g. (74%). The white crystalline product melted at 70–71.5° C. After recrystallization from petroleum ether (30–60° C.) the white crystalline solid melted at 71–72° C.

Analysis.—Calculated for $C_{19}H_{19}F_3N_2O_2$ (percent): C, 62.63; H, 5.26; N, 7.69. Found (percent): C, 62.63; H, 5.22; N, 7.67.

EXAMPLE 2

4-acetylphenylacetic acid phenylhydrazone

To a stirring solution of 6.0 g. (0.034 mole) of 4-acetylphenylacetic acid in 50 ml. of absolute ethanol and a catalytic amount of glacial acetic acid was slowly added 3.67 g. (0.034 mole) of phenylhydrazine. The mixture was heated to reflux and allowed to cool. The phenylhydrazone which crystallized out of solution was collected by filtration. An excess of water was added to the filtrate and this mixture was filtered. The combined solids were recrystallized from methanol. The collected solid was triturated in isopropyl ether and filtered. After drying, the solid weighed 6.0 g. (66%) and melted at 168–171° C.

Analysis.—Calculated for $C_{16}H_{16}N_2O_2$ (percent): C, 71.62; H, 6.01; N, 10.44. Found (percent): C, 71.39; H, 5.99; N, 10.19.

The physical data of additional phenylhydrazones (Examples 3–15) prepared as described in Example 1 are listed in Table I.

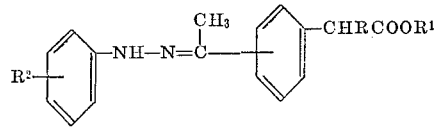

| Example | R | R¹ | R² | M.P., °C. | Substituted [a] |
|---|---|---|---|---|---|
| 3 | H | H | H | 144–146 | Meta. |
| 4 | H | $C_2H_5$ | H | 99.5–99 | Para. |
| 5 | H | $C_2H_5$ | o-Cl | 59–61 | Do. |
| 6 | H | $C_2H_5$ | p-Cl | -------- | Do. |
| 7 | H | $C_2H_5$ | m-Cl | 114–115 | Do. |
| 8 | H | $C_2H_5$ | o-F | 85–87 | Do. |
| 9 | H | $C_2H_5$ | p-F | 133–135 | Do. |
| 10 | H | $C_2H_5$ | m-F | 114.5–116.5 | Do. |
| 11 | H | $C_2H_5$ | m-$CF_3$ | 128.5–129.5 | Do. |
| 12 | H | H | m-$CF_3$ | 160.5–162.5 | Do. |
| 13 | H | $C_2H_5$ | p-$CH_3$ | 130 | Do. |
| 14 | H | $C_2H_5$ | p-$CH_3O$ | -------- | Do. |
| 15 | H | H | p-F | 157–159 | Do. |

[a] Relation to acetate (acetic acid) substituent.

EXAMPLE 16

Ethyl p-(indol-2-yl)-phenylacetate

A mixture of 1.5 g. (0.005 mole) of ethyl-4-acetylphenylacetate phenylhydrazone in 20 g. of polyphosphoric acid was heated to 100° C. The heat of reaction maintained the temperature at 100–120° C. for 15 minutes. Ice and water were stirred into the reaction mixture and the product separated from solution. The mixture was extracted with ether. The combined ethereal extracts were dried over anhydrous magnesium sulfate and filtered. The filtrate was concentrated under reduced pressure and the residual solid weighed 1.3 g. (93%). The solid was recrystallized from benzene-isooctane and melted at 116–118° C.

Analysis.—Calculated for $C_{18}H_{17}NO_2$ (percent): C, 77.40; H, 6.13; N, 5.01. Found (percent): C, 77.81; H, 6.15; N, 5.06.

EXAMPLE 17 p-(Indol-2-yl)phenylacetic acid

A stirred mixture of 44.9 g. (0.152 mole) of ethyl-4-acetylphenylacetate phenylhydrazone in 310 g. of polyphosphoric acid was slowly heated to 90° C. The mixture began to lose viscosity and turn dark. The heat source was removed and stirring was continued as the temperature rose to 115° C. When the temperature began to drop, a large excess of ice was added with rapid stirring. The reaction mixture was diluted with water to a volume of about one liter. The mixture was filtered and the separated solid was collected. The ester was stirred in 800 ml. of 50% sulfuric acid for 16 hours. The acidic mixture was diluted with water to about four liters and filtered. The collected solid was recrystallized from isopropanol to give 21 g. (55%) of product which melted at 248–250° C.

Analysis.—Calculated for $C_{16}H_{13}NO_2$ (percent): C, 76.48; H, 5.22; N, 5.57. Found (percent): C, 76,57; H, 5.25; N, 5.68.

EXAMPLE 18 p-(5-chloroindol-2-yl)phenylacetic acid

A stirred mixture of 12.5 g. (0.038 mole) of ethyl 4-acetylphenylacetate p-chlorophenylhydrazone and 100 g. of polyphosphoric acid was heated until the pot temperature reached 75–80° C. The exothermic reaction at this point raised the temperature to 95–100° C. The mixture was stirred at 95–100° C. for 15 minutes, then was cooled and an excess of water was added. The solid which separated was collected by filtration. The solid was dissolved in anhydrous ether and dried over anhydrous sodium sulfate. After filtering the mixture, the ether was removed under reduced pressure and the solid ester which remained weighed 7.6 g. and was recrystallized from ethanol. A stirred solution of 7.0 g. of the ester in 100 ml. of ethanol and 10 ml. of 50% aqueous potassium hydroxide was heated until complete solution of solids occurred and then stirred at room temperature overnight. The solution was made acidic with hydrochloric acid and filtered. The solid weighed 5.2 g. After recrystallization from isopropanol 3 g. (34%) of product was obtained which melted at 220° C. (dec.).

*Analysis.*—Calculated for $C_{16}H_{12}ClNO_2$ (percent): C, 67.26; H, 4.23; N, 4.90. Found (percent): , 67.45, H, 4.43; N, 4.61.

EXAMPLE 19 p-(6-chloroindol-2-yl)phenylacetic acid

A stirred mixture of 13.2 g. (0.04 mole) of ethyl 4-acetylphenylacetate m-chlorophenylhydrazone and 130 g. of polyphosphoric acid was heated to 110° C. An exothermic reaction at this point raised the temperature to 130° C. The temperature was maintained at 125–130° C. for 15 minutes, after which time an excess of cracked ice and water was added and the 12.7 g. of solid which separated was collected by filtration. The solid which was a mixture of ethyl p-(6-chloroindol-2-yl)phenylacetate and ethyl p-4-chloroindol-2-yl)phenylacetate was dissolved in benzene and placed on a magnesium silicate column. A gradient elution using benzene-acetone did not give complete separation. However, 3.7 g. of pure ethyl p-(6-chloroindol - 2 - yl)phenylacetate crystallized from the eluate. The ester was hydrolyzed to the acid in 100 ml. of ethanol and 100 ml. of 6 N sodium hydroxide overnight. The solution was made acidic with hydrochloric acid and the free acid was extracted into ether. The combined ethereal extracts were dried and concentrated under vacuum. The residual solid weighed 2.6 g. (22.7%) and upon recrystallizing from isopropanol-water gave 2.0 g. of product which melted at 242–244° C.

*Analysis.*—Calculated for $C_{16}H_{12}ClNO_2$ (percent): C, 67.26; H, 4.23; N, 4.90. Found (percent): C, 67.34; H, 4.23; N, 4.91.

EXAMPLE 20 p-(4-chloroindol-2-yl)phenylacetic acid

The combined column filtrates from Example 19 were concentrated under reduced pressure to give approximately 2 g. of a yellow solid which contained a major portion of ethyl p-(4-chloroindol-2-yl)phenylacetate. The solid was heated overnight in ethanolic sodium hydroxide solution. The basic solution was acidified and the acidic solution was extracted with ether from which 1.1 g. (9.7%) of p-(4-chloroindol-2-yl)phenylacetic acid was obtained. The acid melted at 165–167° C. after crystallization from benzene.

*Analysis.*—Calculated for $C_{16}H_{12}ClNO_2$ (percent): C, 67.26; H, 4.23; N, 4.90. Found (percent): C, 67.65; H, 4.30; N, 4.88.

EXAMPLE 21

Ethyl p-(5-fluoroindol-2-yl)phenylacetate

A stirred mixture of 12.5 g. (0.04 mole) of ethyl 4-acetylphenyl acetate p-fluorophenylhydrazone and 100 g. of polyphosphoric acid was heated to 90° C. An exothermic reaction at this point raised the temperature to 130–135° C. The mixture was stirred until the temperature fell below 100° C., at which point an excess of cracked ice was added. The separated crude solid was stirred in about 400 ml. of chloroform and filtered to remove chloroform insoluble material. The filtrate was concentrated under reduced pressure to give 10.0 g. (85%) of a light green solid. The solid was recrystalized from isopropanol to give 7.0 g. of light yellow crystals which melted at 150.5–152° C.

*Analysis.*—Calculated for $C_{18}H_{16}FNO_2$ (percent): C, 72.71; H, 5.42; N, 4.71. Found (percent): C, 72.35; H, 5.47; N, 4.47.

EXAMPLE 22 p-(5-fluoroindol-2-yl)phenylacetic acid

A mixture of 5.0 g. (0.017 mole) of ethyl p-(5-fluoroindol-2-yl)phenylacetate in 250 ml. of ethanol and 50 ml. of 6 N sodium hydroxide was stirred at room temperature for two hours. The reaction mixture was made acidic with 6 N hydrochloric acid and diluted with water to about 1.5 liters. The aqueous acid solution was extracted with ether and the combined ether extracts were washed with water and dried over anhydrous magnesium sulfate. The mixture was filtered and the solvent was removed under reduced pressure. The solid residue (4.2 g.; 93%) melted at 238–243° C. and was recrystallized from isopropanol to give 3.2 g. of product which melted at 241–242° C.

*Analysis.*—Calculated for $C_{16}H_{12}FNO_2$ (percent): C, 71.37; H, 4.49; N, 5.20. Found (percent): C, 71.39; H, 4.54; N, 5.08.

EXAMPLE 23 p-(6-fluoroindol-2-yl)-phenylacetic acid

A mixture of 14.9 g. (0.0475 bole) of ethyl 4-acetylphenyl acetate m-fluorophenylhydrazone and 140 g. of polyphosphoric acid was stirred and heated to about 120° C. The reaction became exothermic and the temperature rose to about 130–135° C. The temperature was maintained at 125–135° C. for about 15 minutes. After the mixture cooled to below 100° C. an excess of cracked ice was added to the mixture. The aqueous mixture was extracted with ether and the combined ethereal extracts were washed with water and dried over anhydrous magnesium sulfate. The mixture was filtered and the ether filtrate was concentrated under reduced pressure to give 12.2 g. of solid. The solid was recrystallized twice from benzene to give a melting point of 165–168° C. The nuclear magnetic resonance spectrum showed the solid to be ethyl p-(6-fluoroindol-2-yl)phenylacetate. After a third recrystallization from benzene, the melting point was 167–171° C. The solid weighing 2.6 g. (18.5%) was hydrolyzed in 50 ml. of ethanol and 25 ml. of 6 N sodium hydroxide at room temperature for three hours. The basic mixture was diluted to about 500 ml. with water and made acidic with 6 N hydrochloric acid. The aqueous acidic solution was extracted with ether and the combined ethereal extracts were washed with water, dried over anhydrous magnesium sulfate, and filtered. The filtrate was concentrated under reduced pressure to give 2.2 g. of product. Recrystallization from ethanol-water gave 1.0 g. which melted at 240–242° C.

*Analysis.*—Calculated for $C_{16}H_{12}FNO_2$ (percent): C, 71.37; H, 4.49; N, 5.20. Found (percent): C, 70.97; H, 4.46; N, 5.05.

EXAMPLE 24 p-(4-fluoroindol-2-yl)phenylacetic acid

The combined benzene filtrates from the crystallizations of Example 23 were evaporated under reduced pressure to give 3.6 g. of solid. The solid was dissloved in 75 ml. of ethanol and 25 ml. of 6 N sodium hydroxide and stirred at room temperature for four hours. The mixture was diluted to about 500 ml. with water, made acidic with 6 N hydrochloric acid and the product was extracted with ether. The ether extracts were washed with water, dried over anhydrous magnesium sulfate, and filtered. The filtrate was concentrated under reduced pressure to give 3.3 g. of solid. The solid was triturated in benzene and filtered. The benzene was removed under reduced pressure and 0.8 g. of solid remained. The solid was recrystallized from benzene to give 0.6 g. (4.7%) of p-(4-fluoroindol-2-yl)phenylacetic acid which melted at 175–177° C.

*Analysis.*—Calculated for $C_{16}H_{12}FNO_2$ (percent): C, 71.37; H, 4.49; N, 5.20. Found (percent): C, 71.40; H, 4.56; N, 4.90.

EXAMPLE 25

Ethyl p-(5-methylindol-2-yl)phenylacetate

A stirred mixture of 9.3 g. (0.03 mole) of ethyl 4-acetyl-phenylacetate p-methylphenylhydrazone and 95 g. of polyphosphoric acid was heated slowly to 80° C. The reaction mixture became exothermic and rapidly rose to 105–108° C. with evolution of gas. After the mixture had cooled, the temperature was again elevated to 105° C.; no further evolution of gas was evident. The reaction mixture was cooled to about 80° C. and poured onto cracked ice. The mixture was diluted to about 600 ml. with water and extracted with ether. The combined ethereal extracts were washed with water, dried over magnesium sulfate and filtered. The filtrate was concentrated under reduced pressure. The crude solid which remained weighed 7.4 g. (84%) and melted at 136–150° C. Recrystallization of the solid from ethanol raised the melting point to 157–158° C.

*Analysis.*—Calculated for $C_{19}H_{19}NO_2$ (percent): C, 77.79; H, 6.53; N, 4.77. Found (percent): C, 77.45; H, 6.54; N, 4.52.

EXAMPLE 26 p-(5-methylindol-2-yl)phenylacetic acid

A slurry of 5.0 g. (0.017 mole) of ethyl p-(5-methylindol-2-yl)phenylacetate in 50 ml. of ethanol and 25 ml. of 6 N sodium hydroxide was stirred at reflux for 15 minutes and then allowed to stir overnight at room temperature. The reaction mixture was made acidic with 6 N hydrochloric acid and extracted with ether. The ethereal extracts were washed with water, dried over magnesium sulfate and filtered. The filtrate was concentrated under reduced pressure to give 2.0 g. of gray-green solid. The aqueous portion of the extracted mixture was filtered and the solid collected weighed 0.5 g. The collected solids weighed 2.5 g. (55%) and melted at about 270° C. Recrystallization from ethanol gave 1.6 g. of off-white crystalline solid which melted at 260–265° C. with decomposition.

*Analysis.*—Calculated for $C_{17}H_{15}NO_2$ (percent): C, 76.96; H, 5.70; N, 5.28. Found (percent): C, 76.57; H, 5.69; N, 4.96.

EXAMPLE 27

Ethyl p-(5-methoxyindol-2-yl)phenylacetate

A mixture of 9.4 g. (0.054 mole) of p-methoxyphenylhydrazine hydrochloride, 11.1 g. (0.054 mole) of ethyl 4-acetylphenylacetate and 1 ml. of glacial acetic acid in 150 ml. of absolute ethanol was refluxed for about one-half hour. Dry hydrogen chloride gas was bubbled into the reaction mixture until it was saturated. After standing overnight, the reaction mixture was filtered to remove the ammonium chloride which precipitated from solution. The filtrate was concentrated under reduced pressure. The residual black oil weighed 12.1 g. The oil which solidified on standing was dissolved in benzene and placed on a magnesium silicate column. Upon elution with a benzene-acetone gradient, the product was obtained in the first fraction. The solid weighed 5.4 g. and was triturated with petroleum ether and filtered to give 4.0 g. of pure product (24%). Recrystallization from benzene-isooctane gave 3.6 g. of product which melted at 122–124° C.

*Analysis.*—Calculated for $C_{19}H_{19}NO_3$ (percent): C, 73.77; H, 6.19; N, 4.53. Found (percent): C, 73.77; H, 6.20; , 4.28.

EXAMPLE 28 p-(5-methoxyindol-2-yl)phenylacetic acid

A mixture of 2.3 g. (0.0075 mole) of ethyl p-(5-methoxyindol-2-yl)phenylacetate in 60 ml. of a 1:1 solution of 6 N sodium hydroxide and ethyl alcohol was warmed for about one hour. The reaction mixture was diluted to about 250 ml. with water and made acidic with 6 N hydrochloric acid. The acidic solution was extracted with ether. The ethereal extracts were combined and washed with water, dried over anhydrous magnesium sulfate and filtered. The filtrate was concentrated under reduced pressure to give 1.9 g. of white solid. The solid was recrystallized from ethanol-water to give 1.6 g. (90%) melting at 204–206° C.

*Analysis.*—Calculated for $C_{17}H_{15}NO_3$ (percent): C, 72.58; H, 5.38; N, 4.98. Found (percent): C, 72.71; H, 5.48; N, 5.02.

EXAMPLE 29

Ethyl p-indol-2-yl-α-methylphenylacetate

Using the procedure of Example 1, ethyl 4-acetyl-phenyl-α-methylphenylacetate is mixed and cyclized in polyphosphoric acid to give ethyl p-indol-2-yl-α-methylphenylacetate.

EXAMPLE 30

Ethyl p-indol-2-yl-α-ethylphenylacetate

Using the procedure of Example 16, ethyl 4-acetylphenyl-α-ethylphenylacetate is mixed and cyclized in polyphosphoric acid to give ethyl p-indol-2-yl-α-ethylphenylacetate.

EXAMPLE 31 m-(Indol-2-yl)phenylacetic acid

A mixture of 50.0 g. (0.186 mole) of 3-acetyl phenylacetic acid phenylhydrazone and 30 g. of polyphosphoric acid was stirred and heated to a temperature of 75–80° C. The temperature rose slowly to 95° C. and was maintained at that point for 30 minutes. After the temperature returned to about 70° C., ice and water were added until a volume of about 1.5 liters resulted. After standing for 16 hours, the mixture was filtered and the collected solid was air dried. The solid was dissolved in hot ethanol, treated with charcoal and filtered. An excess of water was added to the filtrate and the solid which separated was collected by filtration. The crude product weighed 20 g. (43%). Recrystallization from acetone-chloroform gave 4.5 g. of pure material melting at 217–219° C.

*Analysis.*—Calculated for $C_{16}H_{13}NO_2$ (percent): C, 76.48; H, 5.22; N, 5.57. Found (percent): C, 76.21; H, 5.24; N, 5.58.

FORMULATION AND ADMINISTRATION

The present invention also contemplates novel compositions containing the compounds of the invention as active ingredients. In forming the novel compositions of this invention, the active ingredient is incorporated in a suitable carrier, illustratively, a pharmaceutical carrier. Suitable pharmaceutical carriers which are useful in formulating the compositions of this invention include starch, gelatin, glucose, magnesium carbonate, lactose, malt and the like. Liquid compositions are also within the purview of this invention and suitable liquid pharmaceutical carriers include ethyl alcohol, propylene glycol, glycerine, glucose syrup and the like.

The following are examples of compositions formed in accordance with this invention.

(1) Capsules

Capsules of 50 mg. and 10 mg. of active ingredient per capsule are prepared.

| Typical blend for encapsulation: | Per capsule, mg. |
|---|---|
| Active ingredient | 50.0 |
| Lactose | 251.7 |
| Starch | 129.0 |
| Magnesium stearate | 4.3 |
| Total | 435.0 |

Additional capsule formulations preferably contain a higher dosage of active ingredient and are as follows:

| Ingredients: | 100 mg. per capsule |
|---|---|
| Active ingredient | 100.0 |
| Lactose | 231.5 |
| Starch | 99.2 |
| Magnesium stearate | 4.3 |
| Total | 435.0 |

In each case, uniformly blend the selected active ingredient with lactose, starch, and magnesium stearate and encapsulate the blend.

(2) Tablets

A typical formulation for a tablet containing 50.0 mg. of active ingredient per tablet follows. The formulation may be used for other strengths of active ingredient by adjustment of weight of dicalcium phosphate.

| | Per tablet, mg. |
|---|---|
| (1) Active ingredient | 50.0 |
| (2) Milo starch | 20.0 |
| (3) Corn starch (paste) | 38.0 |
| (4) Lactose | 90.0 |
| (5) Calcium stearate | 2.0 |
| Total | 200.0 |

Uniformly blend the active ingredient, lactose, milo starch and the corn starch. This blend is granulated using water as a granulating means. The wet granules are passed through an eight mesh screen and dried at 140 to 160 degrees Fahrenheit overnight. The dried granules are passed through a number ten mesh screen and blended with the proper amount of calcium stearate and this blend is then converted into tablets on a suitable tablet press.

Various modifications and equivalents will be apparent to one skilled in the art and may be made in the compounds, compositions, methods, and procedures of the present invention without departing from the spirit or scope thereof, and it is therefore to be understood that the invention is to be limited only by the scope of the appended claims.

What is claimed is:
1. A heterocyclic compound of the formula

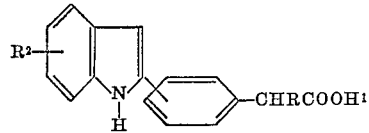

wherein;
R is selected from the group consisting of hydrogen and lower alkyl,
$R^2$ is selected from the group consisting of hydrogen, halogen, trifluoromethyl, lower-alkyl and lower-alkoxy.
2. A compound of claim 1 which is p-(indol-2-yl) phenylacetic acid.
3. A compound of claim 1 which is m-(indol-2-yl) phenylacetic acid.
4. A compound of claim 1 which is p-(6-fluoroindol-2-yl)phenylacetic acid.
5. A compound of the formula

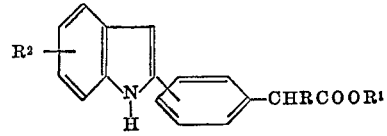

wherein;
R is selected from the group consisting of hydrogen and lower alkyl,
$R^1$ is lower alkyl, and
$R^2$ is selected from the group consisting of hydrogen, halogen, trifluoromethyl, lower-alkyl and lower-alkoxy.

References Cited
UNITED STATES PATENTS
3,687,971  8/1972  Shen et al. _____ 260—326.3

ALEX MAZEL, Primary Examiner
J. A. NARCAVAGE, Assistant Examiner

U.S. Cl. X.R.
260—518; 424—274